United States Patent [19]

Blake et al.

[11] 4,033,620

[45] July 5, 1977

[54] BEE HIVE CARRIER AND TRANSPORT MEANS

[76] Inventors: Robert L. Blake; James David Blake, both of 1821 N. 28th St., Phoenix, Ark. 85008

[22] Filed: Sept. 4, 1975

[21] Appl. No.: 610,144

[52] U.S. Cl. .............................. 296/24 C; 6/4 R; 214/16 B
[51] Int. Cl.² ...................................... B62D 33/04
[58] Field of Search .................... 296/24 R, 24 C; 214/16 B; 6/2 R, 24, 3, 4 R, 4 A, 4 B

[56] References Cited

UNITED STATES PATENTS

| | | | |
|---|---|---|---|
| 1,432,439 | 10/1922 | Bixler | 296/24 R |
| 3,439,364 | 4/1969 | Paoletti | 6/4 R |
| 3,588,166 | 6/1971 | Day | 296/24 R |
| 3,589,768 | 6/1971 | Wilson | 296/24 R |
| 3,633,963 | 1/1972 | Haynes | 296/24 C |
| 3,724,389 | 4/1973 | Greaves | 214/16 B |
| 3,829,189 | 8/1974 | Staller | 214/16 B |
| 3,865,446 | 2/1975 | Mastronardi | 214/16 B |

*Primary Examiner*—Joseph F. Peters, Jr.
*Assistant Examiner*—John A. Carroll

[57] ABSTRACT

The present disclosure relates to a bee hive carrier and transport means comprising a frame having bee hive supports each capable of supporting a plurality of bee hives in closely adjacent relationship to each other; said bee hive supports being moveable relative to each other and disposable in closely adjacent relationship to each other whereby a large number of bee hives may be supported in compact relationship to each other on said frame, some of said bee hive supports being moveable relative to other bee hive supports so as to provide for the moving of the bee hives on one of said supports away from the bee hives on an adjacent support in order to provide space between the supports and respective hives for the bees to work and for manual servicing of the hives; the disclosure also relating to an enclosed body for containing and enclosing the aforementioned supports and hives thereon; the enclosure having closeable bee access openings in the sides thereof to provide access for bees to enter hives inside the enclosed body and to thus work into and out of the hives while the hives are in the body.

20 Claims, 9 Drawing Figures

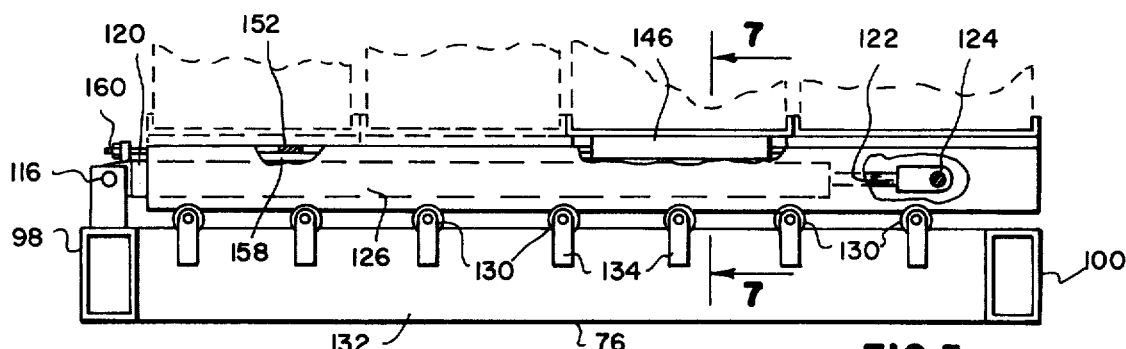
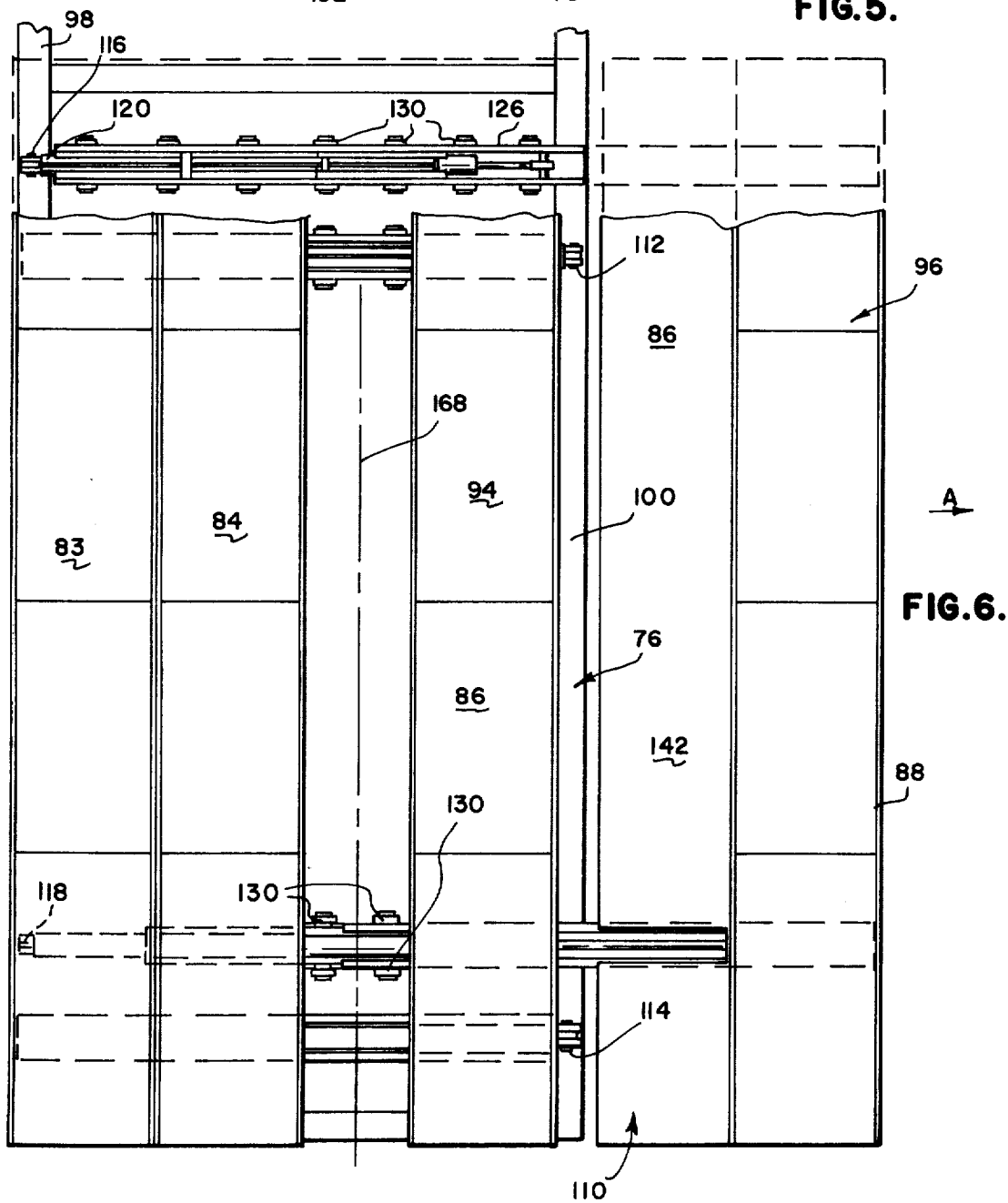

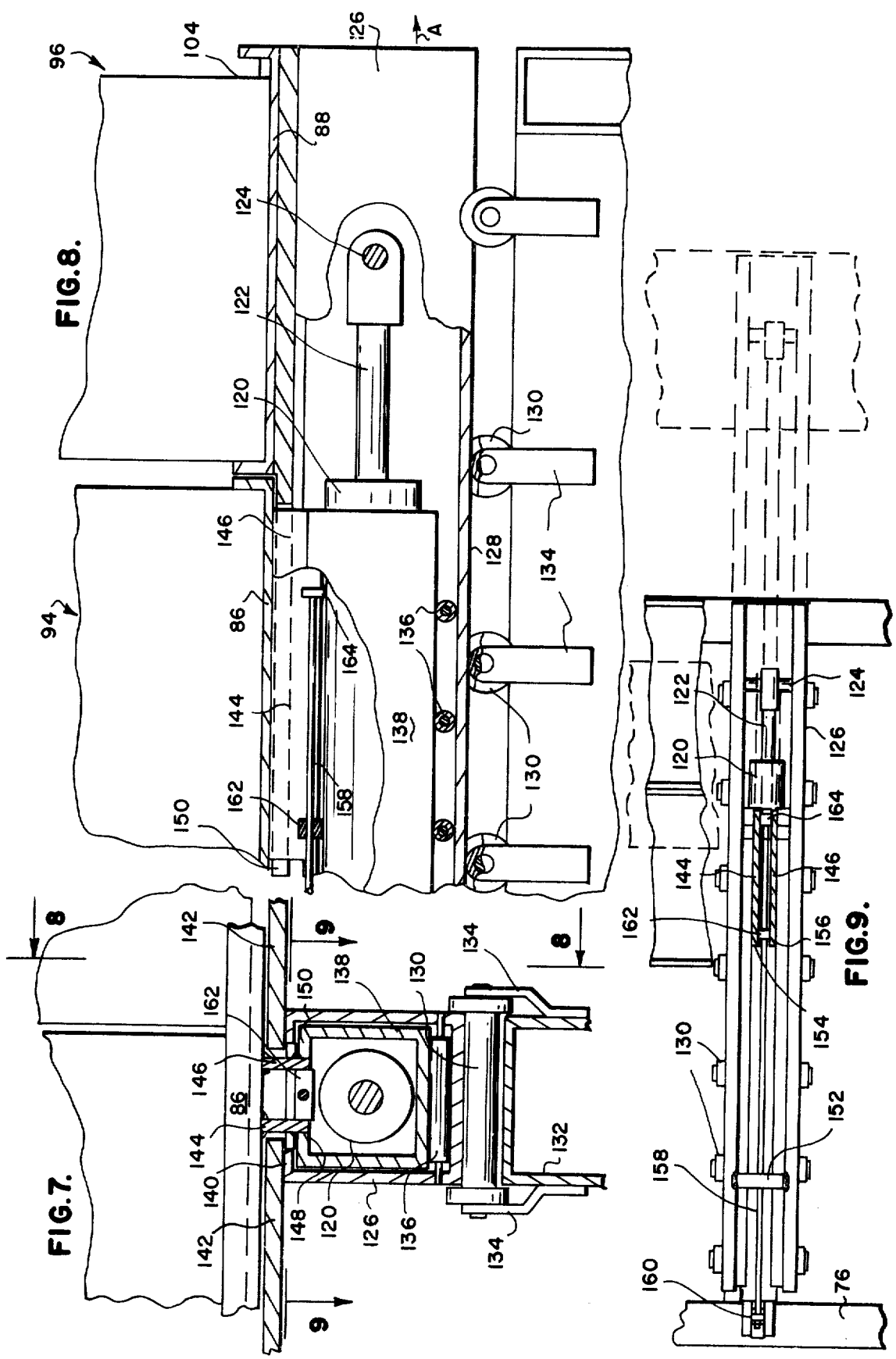

BEE HIVE CARRIER AND TRANSPORT MEANS

BACKGROUND OF THE INVENTION

Heretofore, most bee keepers have merely stacked bee hives on the ground adjacent to areas where bees may work and many of these areas are agricultural areas which are seasonal and in many such areas, insect killing spray is applied by various means such as aircraft or otherwise and during such times it is necessary to move the bees, otherwise they will be killed by the insecticide. Additionally, it has been a problem to move bees from a winter range to a summer range in many areas and the economic feasibility of loading and unloading single bee hives, especially where there are many of them, has cost bee keepers a substantial amount of time and money. Additionally, the winter storage of a great number of individual bee hives often times necessitates moving the bees from one location to another and such operations usually entail the manual loading and unloading of the hives individually.

SUMMARY OF THE INVENTION

The present invention relates to a bee hive carrier and transport means on which a great plurality of bee hives may be loaded in compact relation to each other and on which the bee hives may be moved apart in space relation to each other to provide space for the bees to work and for manual servicing and whereby in this condition the hives all remain on the transport means which may be a common frame or a wheeled vehicle so that when it is desired to move the bee hives, they may be retracted into close proximity relative to each other and moved very readily without manual handling of the individual bee hives. The bee hives on the bee hive carrier and transport means of the invention are preferably in superimposed rows, and each row is carried on a moveable support which is moveably mounted on a frame and whereby the supports are moveable apart to provide walk-ways between the rows of hives for manual servicing and to provide spaced relationship of the hives to allow the bees to work between the rows of hives.

The invention also comprises a bee hive carrier and transport means comprising a frame which is covered by a boxlike van body adapted to enclose the hives of bees such that rows of hives adjacent to the side walls of said boxlike enclosure are provided with access openings in the side wall of the enclosure so that bees from the hives adjacent to the walls may work through openings in the side walls of the housing of boxlike enclosure. Additionally, intermediate rows of hives disposed in the boxlike enclosure are slideably moveable outward through a door enclosed open end of the boxlike enclosure to a position outside the enclosure so that the intermediate rows of hives may be exposed to the open area permitting the bees to work freely in and out of the hives so displaced from the interior of the boxlike enclosure. According to this arrangement of the bee hive carrier and transport means of the invention, the intermediate hives may be retracted into a position between the outermost rows of hives and the doors of the boxlike enclosure such as a large van body man be closed so that the bees may be protected from weather, thieves, vandals, varmits, bears or the like and may also be stored during the off season in the enclosure; the enclosure containing vent passages for the intermediate rows of hives so that the bees may pass to and from the hives to the outside atmosphere so as to dispose of waste material during the off season period such as wintertime.

A simple means, in accordance with the invention, provides for roller and track support of the aforementioned intermediate rows of hives and these roll out from the open end of the van body of boxlike enclosure, and the outboard end of the portion of the frame carrying the intermediate rows of hives is provided with a supporting wheel structure adapted to facilitate the extension of the intermediate hives from the interior of the boxlike van body to the exterior thereof and to provide support therefor while the intermediate rows of hives are disposed outside the van body and the bees are working to and fro relative to these hives. A vehicle frame or a trailer carry frame may support all of the aforementioned bee hive supporting means and the frame may have connected wheels or it may be loaded and unloaded relative to a conventional tilting trailer bed having a winch to reload said frame thereon. Specific details on the apparatus for moveably spacing hive supports apart may include opposite disposed hydraulic cylinders that actuate toward opposite sides of the aforementioned frame for slightly moving superimposed rows of hives on hive supports, all into spaced relation to each other as for example, four rows of hives may be longitudinally disposed in longitudinal parallel with the fore and aft directions of the frame and all four rows of hives may be moved on said supports such that there is a space between each respective row so as to provide for manual servicing as well as room for the bees to work relative to the inlets of the hives. This particular embodiment of the invention involving lateral displacement and spacing of the rows of hives may be mounted either on a basic frame transportable by a trailer or it may be mounted with regular chassis wheels as desired. Additionally, various covers may be provided for the hives when the rows of hives are retracted into almost continuous relation to each other laterally of the longitudinal axis of the frame.

Accordingly, it is an object of the invention to provide a common frame for a great plurality of bee hives whereon rows of hives are supported on moveable supports and these supports are moveable apart relative to each other on the frame so as to provide spacing for the bees to work between the rows of hives and for manual servicing thereof.

Another object of the invention is to provide for convenience of transporting large numbers of bee hives on a common carrier so that they may be readily transported at a moment's notice.

Another object of the invention is to provide a variety of mechanism for spaceably disposing rows of hives apart on a frame or vehicle chassis and for retracting the hives into close proximity to each other for storage or transport.

Another object of the invention is to provide a van boxlike enclosure for a plurality of superimposed rows of bee hives which may afford winter storage as well as air conditioning for bees to condition them early so as to build up the force before pollen is ready thereby attaining maximum production of honey at the earliest possible season of the year.

Further objects and advantages of the invention may be apparent from the following specification, appended claims and accompanying drawings.

BRIEF DESCRIPTION OF THE DRAWINGS

FIG. 5 is a fragmentary sectional view taken from the line 5—5 of FIG. 4 showing the retracted and contiguous relationship of the rows of hives on the frame of the carrier disclosed in FIG. 4;

FIG. 6 is a fragmentary top planned view of the structure shown in FIG. 4 and showing longitudinal hive support members expanded laterally at one side of the middle portion of the frame and showing them in contiguous relationship at the opposite side of the middle to illustrate the relative expanded and contiguous relationships of the hive supports which normally carry a plurality of superimposed hives thereon;

FIG. 7 is an enlarged fragmentary sectional view taken from the line 7—7 of FIG. 6;

FIG. 8 is a sectional view taken from the line 8—8 of FIG. 7; and

FIG. 9 is a reduced fragmentary sectional view taken from the line 9—9 of FIG. 8.

Figure 1:
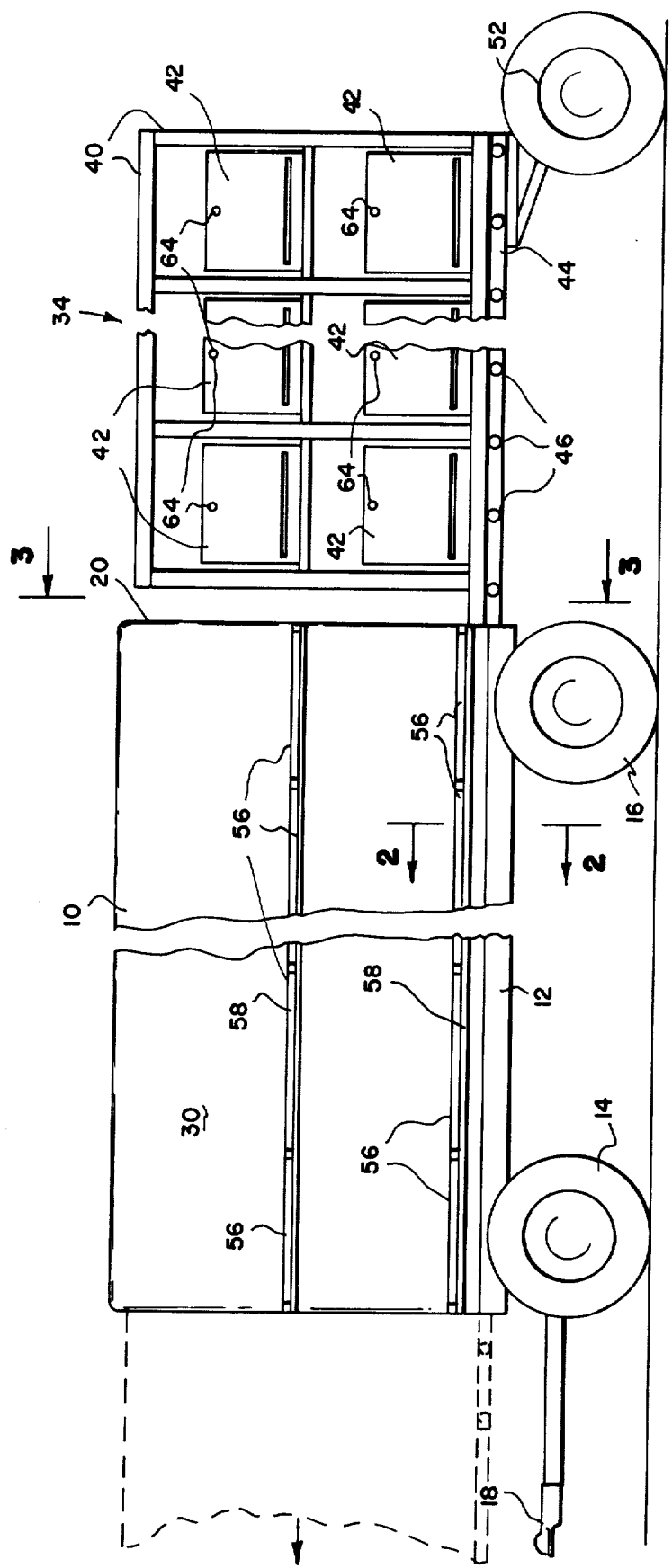
FIG. 1 is a side elevational view of a bee hive carrier and transport means of the present invention comprising a boxlike enclosure or van body supported on wheels with a conventional trailer hitch for towing the boxlike enclosure and showing it in static position with a roll-out frame structure extended from the body and supporting a plurality of rows of hives which are disposed in an intermediate position when in the boxlike enclosure.
Figure 3:
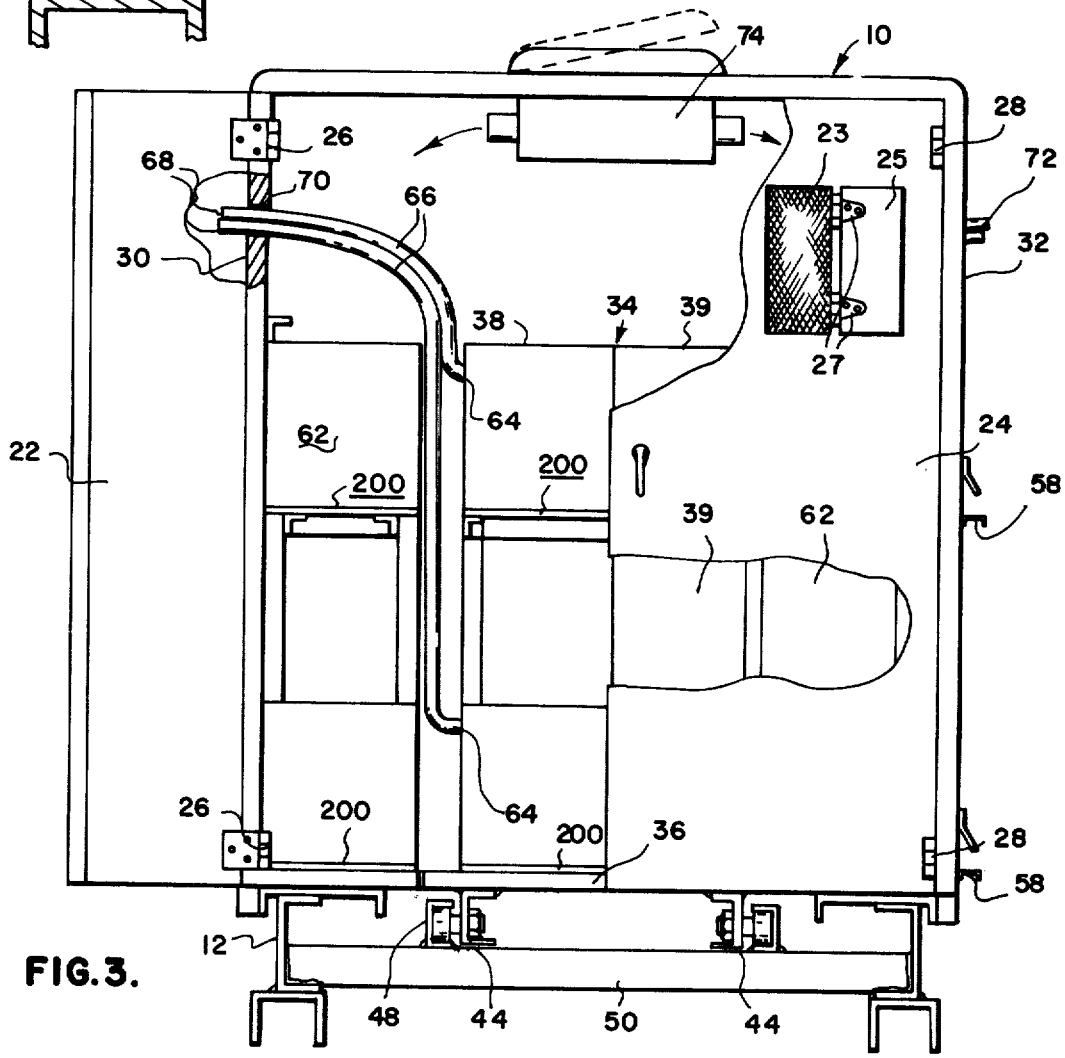
FIG. 3 is an enlarged rear end view of the van body taken from the line 3 of FIG. 1 and showing one of the rear doors open and a portion of another door broken away to amplify the illustration.

The bee hive carrier and transport means of the invention as shown in FIG. 1 comprises a boxlike enclosure 10 which is supported on a frame 12 and this frame 12 is shown supported on a substantially conventional four-wheel trailer chasis comprising a ground engaging wheels 14 and 16 at the front and rear of the body 10, a trailer hitch 18 is connected with the front end 14 for towing the boxlike van body 10. This body 10 is provided with doors at the rear end 20 thereof; these doors being shown in FIG. 3 and designated 22 and 24 and being mounted on respective hinges 26 and 28; these hinges as shown in FIG. 3 of the drawings are on vertical axis near opposite sides 30 and 32 of the van body. The doors 22 and 24 are thus capable of enclosing the end 20 of the boxlike enclosure 10 and are openable so as to permit intermediate rows of hives generally indicated at 34 in FIG. 1 to be slideably moved rearwardly and moved out of the open end of the van body 10 to a position in which the hives of the assembly 34 may be serviced and wherein the bees may have space to work to and fro relative to the extended assembly of hives 34. Doors may be provided on both the front and the back of the van body 10.

It will be understood that doors similar to the doors 22 and 24 may be provided in the front end of the van body 10 and that a frame 44 may be extended through the open doors in the front of the body as indicated by broken lines in FIG. 1 and that the frame 44 may carry superimposed sets of hives 38 and 39 projected forwardly of the van body and thus with the design of the van body a substantial length thereof may provide for the extension of a frame 44 from each end both carrying hives, front and back.

Figure 2:
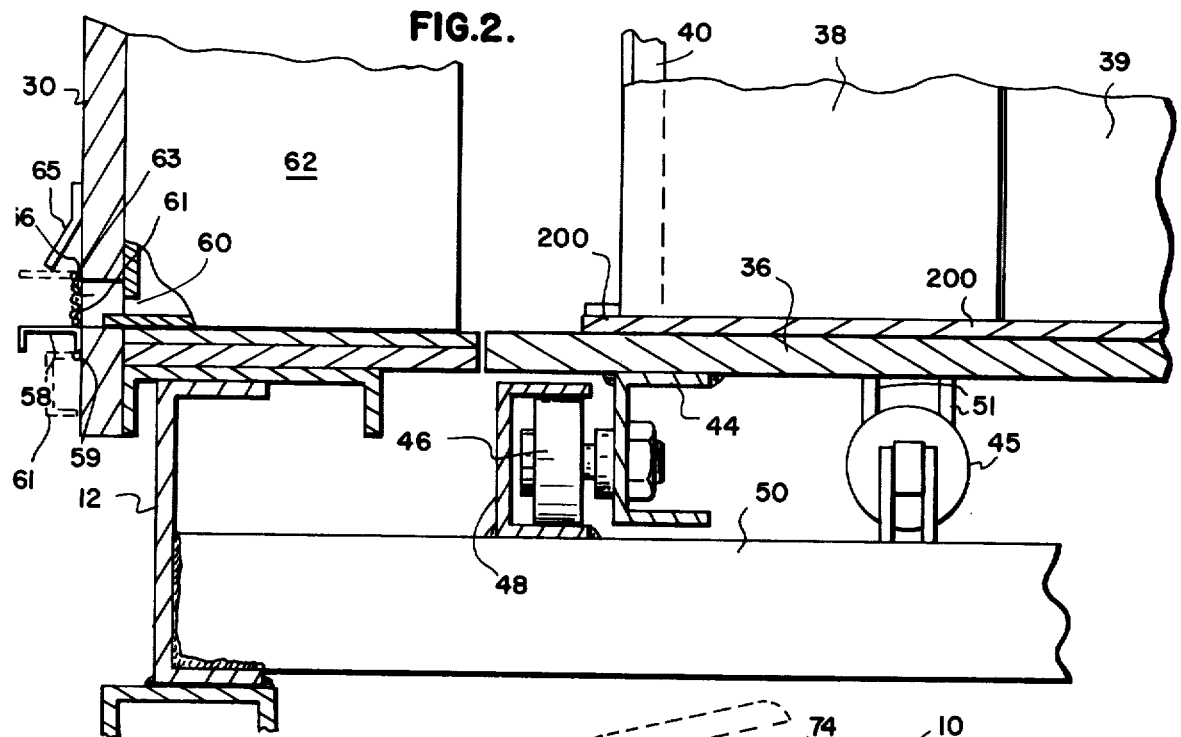
FIG. 2 is an enlarged fragmentary sectional view showing the intermediate rows of hives and their supporting frame structure retracted into the boxlike enclosure or van body.

Referring to FIG. 2 of the drawings, it will be seen that a hydraulic cylinder 45 may be carried by the frame 50 and may be coupled to brackets 51 connected to the platform 36 so that hydraulic means may be used to actuate the frame 44 and platform 36 outwardly relative to the van body and may be provided at either the front end of the back end or both as desired for mechanically and power actuating the frame 44 with its rollers 46 to move within the track portions 48 so as to extend or retract the frame 44 as indicated in FIGS. 1 and 2 of the drawings.

As shown in FIG. 2 of the drawings, each hive entrance 60 is protected by a pivoted screen 61 hinged at 63 beneath a drip rail 65 which overlies the landing platform 58.

This landing platform 58 may be pivoted at 59 so as to be able to retract into a broken line position 61, all as shown best in FIG. 2 of the drawings.

The extended assembly of hives 34 are carried on support means as shown in FIG. 2. This support means comprises a deck 36 carrying relatively contiguous rows 38 and 39 of superimposed hives; the deck 36 supporting frame work 40 which carries individual hives 42 thereon; the hives 42 being in the row 38 as shown in FIG. 2 such that some of the hives are superimposed above the others and the hives 42 in the row 38 are back to back relative to hives in the row 39, shown in FIG. 2.

The deck 36 shown in FIG. 1 and 2 is supported by a pair of channel members 44, there being two of these channel members one on each side of the middle of the frame as shown in FIG. 3 of the drawings. Fixed to the channels 44 are rollers 46 which engage channel tracks 48 carried by cross members 50 of the frame 12. The rollers roll longitudinally on the channels 48 and allow the intermediate assembly of hives designated 34 to be moved rearwardly relative to the rear end 20 of the boxlike van body and enclosure 10 to the position shown in FIG. 1 wherein all of the hives 42 in the row 38 and respective hives in the row 39 are completely outside the van body. In this position a wheel truck assembly 52 supports the outboard end of the channels 44 and this truck assembly 52 may be removed when the assembly of hives 34 is retracted into the van body 10.

As shown in FIGS. 2 and 3, the opposite sides 30 and 32 of the van body are provided with outside passages 56 below which shelves 58 are supported so that bees may pass through these passages 56 and into entrance areas 60 of outermost rows of hives designated 62 which are adjacent the walls 30 and 32, thus, it will be seen that the outermost row 62 adjacent to the opposite sides of the van body or boxlike enclosure remain therein and the bees communicate through the outer opposite side walls 30 and 32 as they pass to and fro during their usual pollen gathering and honey making operations.

The hives of the innermost assembly 34 are provided with access openings 64 therein. These openings 64 communicate with the interior of the hives and as shown in FIG. 3 of the drawings access tubes 66 may be coupled to these holes 64 and outer ends of the tube 66 are designated 68 and these ends project outwardly through an opening 70 and the side 30 of the van body. Similar tubes 72 project out the side 32 of the body and are in communication with the hives in the row 39 as shown in FIG. 2 of the drawings.

The openings 70 as shown in FIG. 3 may be used without the tube 66 so as to permit access of the bees to the interior of the van and they may fly around and find their own hive entrance in this manner. Further, as shown in FIG. 3 a screen door 23 may be mounted in the door 24 above the respective hives and this screen door may be openable to provide an access for bees to enter and leave the interior of the van body in communication with the hives and an additional closed panel door 25 is hinged at 27 and provides a closure for the screen door 23 in the door 24, all as shown best in FIG. 3 of the drawings. This screen door 23 as well as the screens 61 provides for the enclosure of the bees in the van body during times when insecticides are being sprayed in the area so that the bees are kept in the body and are enclosed therein at nightfall and are not permitted to leave until the intensity of the insecticide has subsided so as to be safe for the bees. Additionally the screens 61 may be used during the transport of the van so as to prevent the bees from escaping from the hives through the entrances 60.

These tubes 66 permit the bees to move in and out of the hives during off seasons when it is necessary to remove waste material from the hives and during this time the doors 22 and 24 are closed and an airconditioner 74 in the upper portion of the van body is used to maintain the bees at proper storage temperature and also to elevate the temperature in the van a few weeks before the pollen season starts so as to build up maximum force of the bees in the hives internally in the body so that an optimum number of bees in each hive will be available to start honey making operations at the earliest possible time of the year.

The airconditioner 74 may be used to either heat or cool the interior of the van body or to vent it as desired depending upon ambient conditions and the desired temperature to be maintained inside the van body. Accordingly, it will be appreciated that the bee hive carrier and transport means as shown in FIG. 1 to 3 of the drawings provides not only for rapid transport of the bees from one location to another but also provides for winter storage and also airconditioning of the bees to attain optimum performance of the bees relative to the seasons and to protect the bees from various hazards such as varmits or the like.

In many areas bees are placed adjacent to agricultural produce which is sprayed with insecticides at certain times of the year and due to the convenience of the carrier and transport means shown in FIG. 1 to 3 of the drawings, a great plurality of bee hives may be moved at a moment's notice to avoid subjecting the bees to the insecticide sprays as they are applied to agricultural produce. At such times the bees are moved at night to another location, possibly from a valley area to an elevated area which may be in season for producing pollen and provides a productive place in which the bees may work.

As shown in FIG. 4 to 9 of the drawings, inclusive, a modified carrier and transport means is disclosed and this means comprises a frame 76 which is shown supported on ground engaging wheels 78 and 80, there being two wheels 78 and two wheels 80, the wheels 80 being at the front end of the frame 76 and coupled to a steerable hitch 82 for towing the frame 76.

Figure 4:
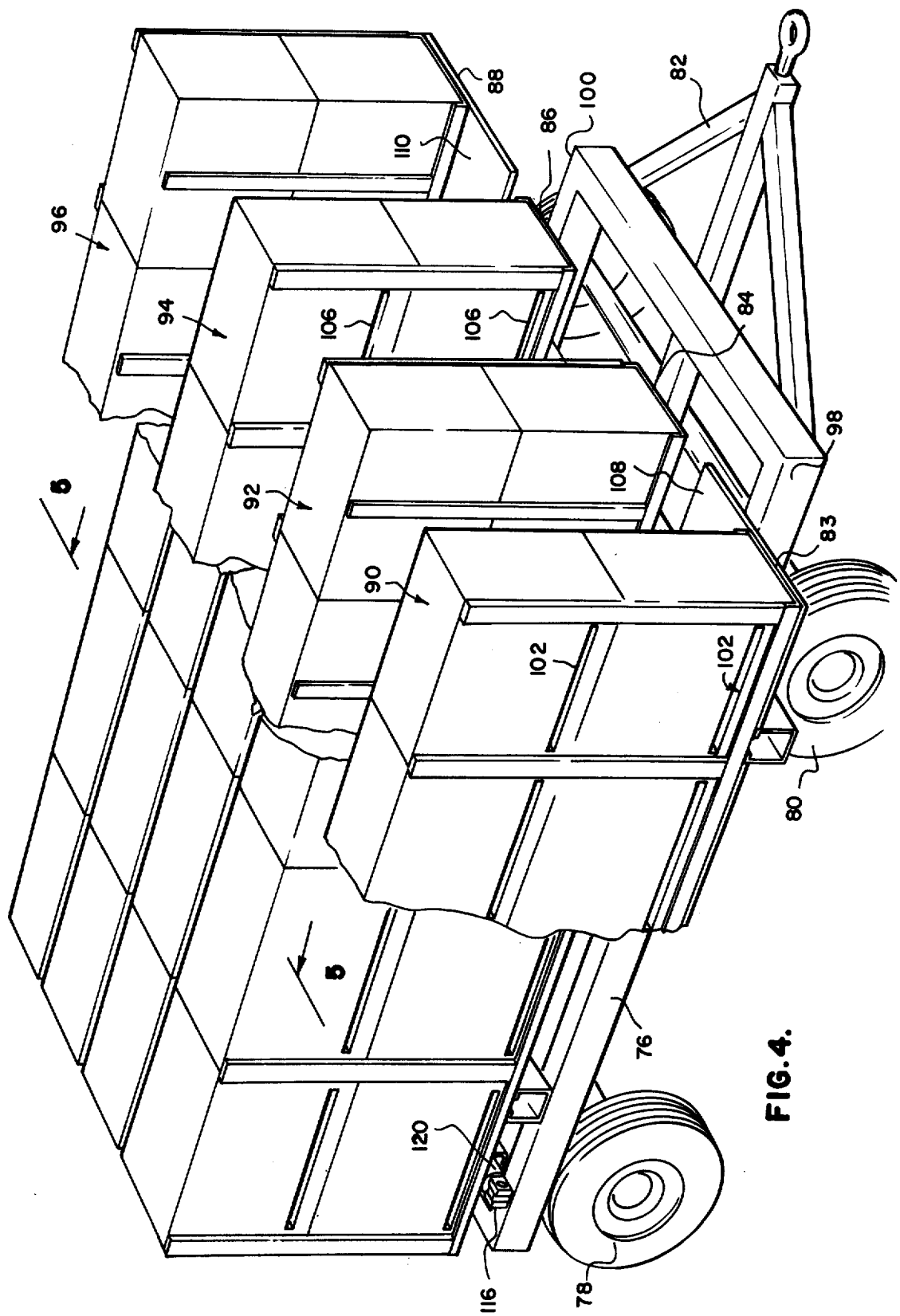
FIG. 4 is a fragmentary perspective view illustrating a trailer chasis supported on wheels and having a frame on which a plurality of hive supports are moveably mounted, the hive supports being elongated longitudinally of the frame and extended laterally relative to each other; the illustration showing the rows of hives in contiguous relationship to each other on the rearward portion of the frame and showing them expanded apart fragmentarily on the forward part of the frame illustrate the relative contiguous and expanded positions of the rows of hives on their respective supports.

Attention is hereby directed to the fact that the aforementioned frame 12 shown in FIG. 1 and the frame 76 shown in FIG. 4 may be carried without connected wheels and may be slideably loaded onto and removed from a tiltable trailer or the like as desired.

Carried on the frame 76 are a plurality of elongated bee hive supports 83, 84, 86 and 88. These supports are generally channel shaped and support rows of hives 90, 92, 94 and 96, respectively. The hive supports 83, 84, 86 and 88 are elongated in a direction fore and aft of the frame 76 and are extendable and retractable laterally relative to opposite sides 98 and 100 of the frame 76. The hives in the rows 90 and 96 are provided with outwardly facing access openings 102 and 104 respectively while the hives in the rows 92 and 94 are provided with access openings 106 so that the bees work between the rows 92 and 94 and so that the bees work on the outer sides on the rows 90 and 96 thereby providing pathways 108 and 110 respectively between the rows 90 and 92 and the rows 94 and 96. Thus, manual servicing of the hives may be accomplished by persons operating in the pathways 108 and 110.

Pivotal mounts 112 and 114 mount hydraulic cylinders on the side 100 of the frame 76 and pivotal mounts 116 and 118 pivotally mount hydraulic cylinders on the side 98 of the frame 76 thus a pair of hydraulic cylinders are pivotally coupled to the pivotal mounts 112 and 114 and are adapted to extend their plungers toward the side 98 of the frame 76 while a pair of the hydraulic cylinders coupled to the mounts 116 and 118 are provided with plungers adapted to extend toward the side 100 of the frame 76, all as will be hereinafter described in detail. As shown in FIG. 4 of the drawings, a hydraulic cylinder 120 is pivotally coupled to the pivotal mount 116 and this cylinder 120 is shown in FIG. 5 of the drawings. The cylinder 120 is provided with a plunger 122 coupled to a pin 124 and this pin 124 is secured to opposite inner side walls of a generally channel shaped in cross section moveable member 126 shown in cross section in FIG. 7 of the drawings and also shown in FIG. 9 of the drawings as well as in FIG. 8 of the drawings.

This moveable member 126 is provided with a bottom portion 128 moveably supported by rollers 130 fixed to a stationary cross member 132 of the frame 76. The rollers 130 are mounted on the cross member 132 by means of brackets 134, shown best in FIG. 7 of the drawings.

Rotatably mounted in the moveable member 126 are secondary rollers 136 on which an inner telescopic moveable member 138 is mounted. This member is also generally channel shaped in cross section and generally surrounding the respective hydraulic cylinder 120. Thus, the movable member 138 is moveably mounted longitudinally inside the moveable member 126, all as shown best in FIGS. 7 and 8 of the drawings. The moveable member 126 is provided with flanges 140 which extend upwardly above the moveable member 138 and these flanges carry a deck member 142 on which the row 96 of hives is supported and on which the supporting channel 88 is carried by the deck 142.

The row 94 of hives is supported on the support member 86 and this support member 86 is shown in FIG. 7 and is carried by upstanding members 144 and 146 which are fixed to respective flange portions 148 and 150 of the moveable member 138, shown best in FIG. 7, 8 and 9.

Thus, as shown in FIG. 6 the hydraulic cylinder 120 is adapted to extend to plunger 122 and likewise the comparable hydraulic cylinder coupled to the pivotal mounting 118 may extend its plunger uniformly moving the moveable members 126 as shown in FIG. 7 associated with such cylinders and thereby carrying the row of hives 96 on the support 88 laterally to a position shown in FIG. 6 while the row of hives designated 94 are carried on the channel support 86.

As shown in FIGS. 4, 7 and 8 it will be seen that the walkways 108 and 110 comprise the decks 142 hereinbefore described and these decks 142 are provided with slots 150 which straddle the upstanding members 144 and 146 on which the hive support 86 is carried. Thus, when the plungers 122 move the moveable member 126 in the direction of the arrow A, shown in FIG. 7, the deck 150 moves outward into a walkway 110 as shown in FIG. 4 and following this, the moveable member 126 actuates the moveable member 138 in the same direction by means of a cross bar 152 which engages respective ends 154 and 156 of the upstanding supports 144 and 146, hereinbefore described. When this takes place, the bee hive support 88 has already become spaced from the bee hive support 86, a distance sufficient to provide for the walkway 110, then as the moveable member 126 moves further, it moves the bee hive support 86 away from the center of the frame 76 a distance equal to half the amount of the spacing between the bee hive supports 86 and 88. At this time a stop rod 158 which is anchored at 160 to the side of the frame 76 is traversed by a bar 162 coupled to the upstanding members 144 and 146. This member 162 as shown in FIG. 8 of the drawings is eventually engaged by a head portion 164 on the rod 158 thereby limiting the outward movement of the hive support 86.

At this time, the suitable limit switch means controlling the hydraulic system stops the movement at approximately the time when the bar 162 engaged the head 164 hereinbefore described. Thus, the hive support 88 and the hive support 86, as shown in FIG. 6 are moved outward a proper distance from the center line 168 of the frame as shown best in FIG. 6 of the drawings, establishing a walkway between the hives supported on the supports 86 and 88 by means of the hereinbefore mentioned deck 142 which is pulled from beneath the adjacent bee hive support 86.

The bee hive supports 83 and 84, as shown in FIG. 6, are actuated in the opposite direction of the arrow A by means of hydraulic cylinders pivotally coupled to the pivot supports 112 and 114 and these being provided with the plungers similar to the plungers 122 shown in FIG. 8 and thus capable of projecting the hive supports 83 and 84 in the opposite direction of the arrow A in a similar manner as hereinbefore described in connection with the hive supports 86 and 88.

It will be obvious that four rows of bee hives may be conveniently carried on the bee hive carrier as shown in FIG. 4 of the drawings, inasmuch as vehicles are usually limited to an 8 foot width and since the hives are of a reasonable dimension, they may be spaced apart when in static condition for working the bees and for servicing the hives and may be compacted in contiguous relationship to be within an eight-foot overall dimension sideways as for example side to side from the side 98 to the side 100 of the frame 76. When the hives are in compact retracted position as shown at the rear of the vehicle as illustrated in FIG. 4, a suitable canvas or other cover may be placed thereover for storage of the bees or for transporting them at night and such cover may be removed from the hives and may be laterally spaced apart in rows on the supports 83, 84, 86 and 88 as hereinbefore described for working and servicing, and it will be appreciated that with the operation of the hydraulic cylinders hereinbefore described, the hives may be spaced apart or pulled into retracted contiguous relation to each other at a moment's notice for transport or for exposing the hives so that the bees may work within a given location. It will be appreciated that the expandable means as shown in FIG. 1 of the drawings allows the hives to be moved apart longitudinally relative to the longitudinal fore and aft axis of the vehicle or the frame, while the modification shown in FIG. 4 allows the expansion or spaced apart relationship of the rows of hives to take place in a direction laterally of the longitudinal or fore and aft axis of the frame. It will be obvious that the frames may be transported on wheels connected thereto or may be moved off and on a conventional tiltable trailer or any other suitable vehicle chasis.

As shown in FIGS. 2 and 3, trays 200 may be located beneath each superimposed row of hives 62 as well as the rows of hives 38 and 39 so that entire rows of hives may be slideably removed from the boxlike enclosure 30 and such trays may be set on the ground in desired locations. Such tray structures 200 may also be slideably located on the hive supports 83, 84, 86 and 88 to function in the same manner.

Further, it will be obvious that means shown in FIG. 5 to 9 of the drawings may be used in connection with the deck 36 shown in FIG. 2 for the purpose of separating the rows of hives 38 and 39.

It will be obvious to those skilled in the art that various modifications may be resorted to without departing from the spirit of the invention.

We claim:

1. A bee hive carrier and transport means comprising a frame; a plurality of closely adjacent bee hive supports on said frame; each support adapted to carry a plurality of bee hives; some of said supports being moveable supports moveably mounted on said frame so as to permit transport and storage of said hives on said frame in close compact relation to each other and whereby some of said bee hive supports may be moved on said frame to positions wherein bee hives, carried thereon, are displaced and spaced from bee hives carried on the remaining ones of said supports and thereby allowing space around said bee hives for the bees to work and for manual servicing of said bee hives said frame is located in a suitable area for the bees to work.

2. The invention as defined in claim 1, wherein: said bee hive supports are elongated and disposed in adjacent parallel relationship to each other and wherein means is provided for moving some of said supports longitudinally relative to each other so as to displace some of the hives and provide space therearound.

3. A bee hive carrier and transport means comprising a frame; a plurality of closely adjacent bee hive supports on said frame; each support adapted to carry a plurality of bee hives; some of said supports being movable supports moveably mounted on said frame so as to permit transport and storage of said hives on said frame in close compact relation to each other and whereby some of said bee hive supports may be moved on said frame to positions wherein bee hives, carried thereon, are displaced and spaced from bee hives carried on the remaining ones of said supports and thereby allowing space around said bee hives for the bees to work and for manual servicing of said bee hives when said frame is located in a suiable area for the bees to work; a boxlike van body and enclosure having opposite sides and ends; said enclosure containing and surrounding said supports; said body having openings at opposite sides thereof adjacent to which some of said bee hive supports are disposed so as to permit bee hives thereon to communicate with said openings so that bees have access through the sides of said body and enclosure to move in and out of said hives on said supports which are adjacent to the opposite sides of said body; said moveable supports being in intermediate locations between said opposite sides; and hives carried on said moveable supports adjacent thereto whereby longitudinal movement of said supports in said intermediate location allows removal of some of said supports from said body and enclosure.

4. The invention as defined in claim 3, wherein: said moveable supports carry a plurality of bee hives; said plurality of bee hives having tubular vents comprising passage ways adapted to provide access out of and back into the hives on said moveable supports during winter or storage periods; and access doors for said van body adapted to fully enclose the same whereby the inside of said enclosure may be air conditioned during certain periods of the year when bees are in storage.

5. The invention as defined in claim 2, wherein: said enclosure having opposite sides and ends and having doors openable at one end thereof; said frame having a portion slideably moveable relative to said boxlike enclosure and in directions longitudinally of said bee hive supports; said boxlike enclosure being mounted on wheels adapted to roll on the ground; and wheel means coupled to said slideable portion of said frame which carries said moveable bee hive supports so that, as said moveable bee hive supports are moved out of said boxlike enclosure the last mentioned wheel means rolls on the ground and provides support for the moveable bee hive supports and respective slideable portion as it is extended outward into a generally cantilever position outside of said boxlike enclosure.

6. The invention as defined in claim 1, wherein: said bee hive supports are elongated and wherein means on said frame slideably carries said bee hive supports so as to provide for movement of said supports laterally relative to their longitudinal axis so as to provide space between said bee hive supports.

7. The invention as defined in claim 6, wherein: said frame is provided with supporting wheels adapted to roll on the ground and said wheels having forward and rearward directions of rotative movement; said elongated bee hive supports being elongated in directions parallel to the forward and rearward directional movement of said wheels.

8. The invention as defined in claim 6, wherein: there are four of said bee hive supports, all of them elongated and disposed in parallel relationship to each other; bee hives carried on outer most one of said supports and having hive entrances directed outwardly away from the adjacent bee hive supports; a pair of bee hive supports in an intermediate area between said outermost bee hive supports; bee hives carried on said supports in said intermediate area and said last mentioned hives having entrances facing each other and respective supports being moveable apart so as to provide working space for the bees in the hives facing each other; the outer most bee hive supports being spaced from said bee hive supports and said intermediate area to provide a walk-way and working space for manual servicing of all of said hives.

9. The invention as defined in claim 8, wherein: walk plates are coupled to some of said moveable supports and said walk plates being telescopically moveable into positions beneath others of said bee hive supports when said supports are moved into close contiguous side by side relation to each other.

10. The invention as defined in claim 7, wherein: telescopic actuators are coupled to said bee hive supports; said actuators comprising fluid actuated cylinders; said frame having opposite sides generally parallel to the longitudinal axis of said bee hive supports; a plurality of said fluid actuating cylinders being pivotally and stationarily mounted on one side of said frame and having plungers moveable toward the opposite side of said frame; said plungers thus adapted to move some of said bee hive supports in directions laterally and beyond opposite sides of said frame; track means for carrying said bee hive supports in cantilever relationship and in outboard positions beyond the sides of said frame so as to provide for lateral spacing of said bee hive supports and for providing space there between for the bees to work and for manual servicing of hives carried on said supports.

11. The invention as defined in claim 10, wherein: rollers are supported on said frame for carrying said telescopic supports, said telescopic supports being disposed laterally on said frame; one of said telescopic supports being moveably mounted in the other telescopic support; said other of said telescopic supports having an upper side provided with a slot therein; an innermost member of said telescopic support having upstanding means fixed to some of said moveable bee hive supports; other of said bee hive supports being carried on said member having said slot therein; said member having said slot therein having a platform thereon which is moveably disposable under adjacent ones of said bee hive supports when said supports are moved together in close proximity to each other.

12. The invention as defined in claim 11, wherein: position limiting rods are fixed to opposite sides of said frame and are operable to limit movement of some of said bee hive supports relative to said frame when said cylinders actuate said telescopic members.

13. The invention as defined in claim 3, wherein: openable closure means is provided to enclose said openings at opposite sides of said body whereby bees may be prevented from leaving said hives during times when insecticides are sprayed in the area of the hives or during times when the body is being transported from one location to another.

14. The invention as defined in claim 13, wherein: said openable closure means being a screen to provide ventilation for the interior of said body when said bees are contained therein and prevented from moving in and out of said hives.

15. The invention as defined in claim 3, wherein: said body is provided with an openable closure means to allow bees to pass in and out of said body in communication with said hives and whereby said openable closure means is adapted to be closed to prevent bees from passing out of said hives and out of said body at times when insecticides are sprayed in the immediate area thereof and during times when the body is being transported from one place to another.

16. The invention as defined in claim 15, wherein: said openable closure means comprises a screen door adapted to provide for ventilation of said body in surrounding relation with the hives.

17. The invention as defined in claim 3, wherein: said moveable supports in the intermediate area of said frame and body are moveable therefrom through doors in both the forward and the rearward end portions thereof.

18. The invention as defined in claim 2, wherein: an enclosed box-like body contains and surrounds said supports; some of said supports being in intermediate location; said supports being in an intermediate location are the aforementioned moveable mounted supports and are adapted to be moved out of each opposite end of said body and closeable doors in each opposite end through which said supports may be moveably extended.

19. The invention as defined in claim 3, wherein: said enclosure having opposite sides and ends and having doors openable at one end thereof; said frame having a slideable portion slideably moveable relative to said boxlike enclosure and in directions longitudinally of said bee hive supports; said boxlike enclosure being mounted on wheels adapted to roll on the ground; and wheel means coupled to said slideable portion of said frame, which carries said moveable bee hive supports so that, as said moveable bee hive supports are moved out of said boxlike enclosure, the last mentioned wheel means rolls on the ground and provides support for the moveable bee hive supports and respective slideable portion as it is extended outwardly into a generally cantilever position outside of said boxlike enclosure.

20. A bee hive carrier and transport means comprising a frame; a plurality of closely adjacent bee hive supports on said frame; a plurality of bee hives carried on each of said supports; some of said supports being moveable supports moveably mounted on said frame so as to permit transport and storage of said hives on said frame in close compact relation to each other and whereby some of said bee hive supports may be moved on said frame to positions wherein bee hives, carried thereon, are displaced and spaced from bee hives carried on the remaining ones of said supports and thereby allowing space around said bee hives for the bees to work and for manual servicing of said bee hives when said frame is located in a suitable area for the bees to work.

* * * * *